United States Patent [19]

Malsheen et al.

[11] Patent Number: 5,634,084

[45] Date of Patent: May 27, 1997

[54] ABBREVIATION AND ACRONYM/INITIALISM EXPANSION PROCEDURES FOR A TEXT TO SPEECH READER

[75] Inventors: Bathsheba J. Malsheen, San Francisco; Gabriel F. Groner, Palo Alto; Sandra F. Disner, Los Angeles, all of Calif.

[73] Assignee: Centigram Communications Corporation, San Jose, Calif.

[21] Appl. No.: 376,732

[22] Filed: Jan. 20, 1995

[51] Int. Cl.$^6$ ...................................................... G10L 5/00
[52] U.S. Cl. ...................................................... 395/2.69
[58] Field of Search ............................ 395/2.2, 2.69; 381/51, 52

[56] References Cited

U.S. PATENT DOCUMENTS

| | | | |
|---|---|---|---|
| 4,811,400 | 3/1989 | Fisher | 381/44 |
| 4,868,750 | 9/1989 | Kucera et al. | 364/419 |
| 4,979,216 | 12/1990 | Malsheen et al. | 381/52 |
| 5,091,931 | 2/1992 | Milewski | 379/100 |
| 5,157,759 | 10/1992 | Bachenko | 395/2 |
| 5,278,943 | 1/1994 | Gasper et al. | 395/2 |
| 5,384,893 | 1/1995 | Hutchins | 395/2.76 |

FOREIGN PATENT DOCUMENTS

| | | |
|---|---|---|
| 0465058 | 6/1991 | European Pat. Off. . |
| 4123465 | 7/1991 | Germany . |
| PCT/US95/16590 | 5/1996 | WIPO . |

OTHER PUBLICATIONS

Bachenko et al., "Prosidic Phrasing for Speech Synthesis of Written Telecommunications by the Deaf," IEEE GLOBECOM '91, pp. 1391–1395. Dec. 1991.

Fitzpatrick et al., "Parsing for Prosidy: What a Text-to-Speech System Needs from Syntax," IEEE AI Systems in Government, 1989 Conference, pp. 181–194. 1989.

*Primary Examiner*—Allen R. MacDonald
*Assistant Examiner*—Robert Mattson
*Attorney, Agent, or Firm*—Gary S. Williams; Flehr, Hohbach, Test, Albritton & Herbert LLP

[57] ABSTRACT

An improved text-to-speech synthesizer that employs a text to speech converter, a text reader control procedure, a classifier procedure, an abbreviation expansion procedure, and an acronym/initialism expanding procedure is herein described. A classifier procedure is used to classify generate classification values for each word in the text message with regard to syntax, punctuation and membership in predefined classes of words, the predefined classes of words including number, measurement units, geographic designations, and date/time values. An abbreviation expansion procedure evaluates, based on the classification values for words neighboring the identified words, which, if any, of the potential expansion values is applicable, and substitutes the potential expansion for the identified abbreviation word when evaluation yields a success value. An acronym/initialism expanding procedure identifies words in the text message that are acronyms and initialisms, parses pronounceable syllables within the identified words and generates a substitute string that can consist of any combination of letters, numbers, pronounceable syllables or multiple letter identifiers.

13 Claims, 3 Drawing Sheets

ABBREVIATION AND ACRONYM/INITIALISM EXPANSION PROCEDURES FOR A TEXT TO SPEECH READER

The present invention relates generally to text to speech converters, and particularly to an extension of text to speech technology for improving the handling of text that includes abbreviations, acronyms, initialisms, non-standard compound words, numbers, dates, telephone numbers, fractions, times, and the like.

BACKGROUND OF THE INVENTION

The use of text to speech (TTS) converters is well known. TTS converters have been used to improve access to computer stored information by visually impaired persons, and for uses such as in "interactive voice response" (IVR) systems in which a remotely located user accesses digitally stored information in a database via a telephone.

The present invention is directed to computer applications in which voice access to information stored in a computer is desirable, and more particularly to systems that provide voice access to information that by its very nature tends to include a wide variety of formats and individual writing styles, including conventional and nonstandard abbreviations, acronyms, initialisms, numbers, dates, times and telephone numbers in many formats, fractions, inappropriate spacing, emotion indicators (e.g., smiley faces, asterisks and underlines), and the like.

Present text to speech converters can produce intelligible speech only from text which conforms perfectly to the spelling and grammatical conventions of a language. Even the highest quality text to speech converters cannot read typical electronic mail (e-mail) messages intelligibly. Unlike carefully edited text, e-mail messages frequently contain sloppy, misspelled text with random use of case, spacing, fonts, punctuation, emotion indicators and a preponderance of industry-specific abbreviations and acronyms. In order for text to speech conversion to be useful for such applications, it must implement flexible, sophisticated rules for intelligent interpretation of even the most ill-formed text messages.

The difference between an acronym and an initialism is as follows. An acronym is formed from pronounceable syllables, even it is represents a "made up word," while an initialism is not pronounceable except as a sequence of letters and numbers. Thus, "IBM" and "YMCA" are initialisms, while "NASA" and "UNICEF" are acronyms. Some words, such as "MSDOS" and "PCNET" are a mix of acronym and initialism components.

An application that provides telephone access to the user's electronic mail (e-mail) messages using a standard TTS converter will provide inadequate service to end users because a standard TTS converter (A) will attempt to read portions of the e-mail message that the end user does not want to hear, such as the e-mail address of the sender and recipient and the trail of network nodes through which the message was transmitted, and (B) will not properly handle many of abbreviations, acronyms and initialisms typically found in such messages. Moreover, when something is mispronounced, it confuses the listener and makes it difficult to understand portions of the message that are pronounced correctly.

Other voice access applications which are inadequately handled by standard TTS converters include applications for telephone access to a user's personal telephone and address directory or an organization's telephone and address directory, applications for verbal access to information in a spreadsheet, proofreading, and access to computer stored documents by a blind person, and applications which provide audio feedback in addition to visual display.

It is a fact of life that written text in the English language, as well as written text in most other languages, includes a rather large number of abbreviations, measurement values, times and dates and other symbols that the average well educated person knows how to read, but which do not follow the phonetic pronunciation rules applicable to most standard words in the applicable language. Furthermore, many common abbreviations are ambiguous until the context of the abbreviation is determined. For instance, the string "SF" might mean "San Francisco," "Sioux Falls," or "Santa Fe." Another example is that the text:

the 20 ft wayne jumped at the ft wayne indiana meet.

is 1 ft worth buying? is ft worth ahead? dallas 27, ft worth 13 :-)

i believe dr jones lives on oak dr.

i live at 6e maple st and my mother lives at 6 e st.

is correctly spoken by the present invention as if it were written:

The 20 feet Wayne jumped at the Fort Wayne Indiana meet.

Is 1 foot worth buying? Is Fort Worth ahead? Dallas 27, Forth Worth 13, ha ha.

I believe Doctor Jones lives on Oak Drive.

I live at 6 East Maple Street and my mother lives at 6 E Street.

Identical symbols can have different meanings and pronunciations in different contexts. For instance, quotation marks can be used as the inch unit identifier, and for seconds of time and seconds of angular measurement:

| Text | Description |
| --- | --- |
| "Four score and" | Quoted text |
| 3.5" | measurement in inch units |
| 27'35" | angular or directional measurement |

Another large category of troublesome text concerns the differences between acronyms and initialisms. For instance, the term "NASA" is an acronym that is pronounced like a word, while the term "IBM" is an initialism that is pronounced as a sequence of three letters. No product, or literature, known to the inventors discloses a systematic method of distinguishing between acronyms and initialisms and how that should be accomplished for purposes of text to speech conversion.

In summary, the number of examples of text that are problematic for standard TTS converters is large.

It is a primary object of the present invention to provide a system and method for systematically pre-processing text that would not be properly converted into spoken words by a conventional TTS converter so as to produce substituted text that, when processed by a conventional TTS converter, will represent the words that would be spoken by a human reader of the same text.

SUMMARY OF THE INVENTION

In summary, the present invention is a computer system for converting a text message into an audio representation, including a text to speech converter and a text reader control procedure.

A classifier procedure, called by the control procedure, classifies each word in the text message with regard to syntax, punctuation and membership in predefined classes of words, the predefined classes of words including numbers, measurement units, geographic designations, and date/time values. The classifier procedure generates classification values for each of the words in the text message.

An abbreviation expanding procedure, called by the control procedure after execution of the classifier procedure, identifies abbreviation words in the text message that match predefined abbreviations and identifies a set of potential expansion values for each identified abbreviation word. The abbreviation expanding procedure evaluates, based on the classification values for words neighboring the identified words, which, if any, of the potential expansion values is applicable, and substitutes the potential expansion value for the identified abbreviation word when the evaluation yields a success value.

An acronym/initialism expanding procedure identifies words in the text message that are acronyms and initialisms, parses pronounceable syllables within the identified words and generates a substitute string comprising a sequence of units. Each unit in the generated sequence consists of a letter, number, pronounceable syllable or a multiple letter identifier. This procedure can also be applied to expanding e-mail user names such as bjmaslin and cfwong to B J Maslin and C F Wong.

The control procedure passes to the text to speech converter for each word in the text message (A) the expansion value, if any, generated by the abbreviation expanding procedure, (B) the substitute string, if any, generated by the acronym/initialism expanding procedure, and otherwise (C) the word.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
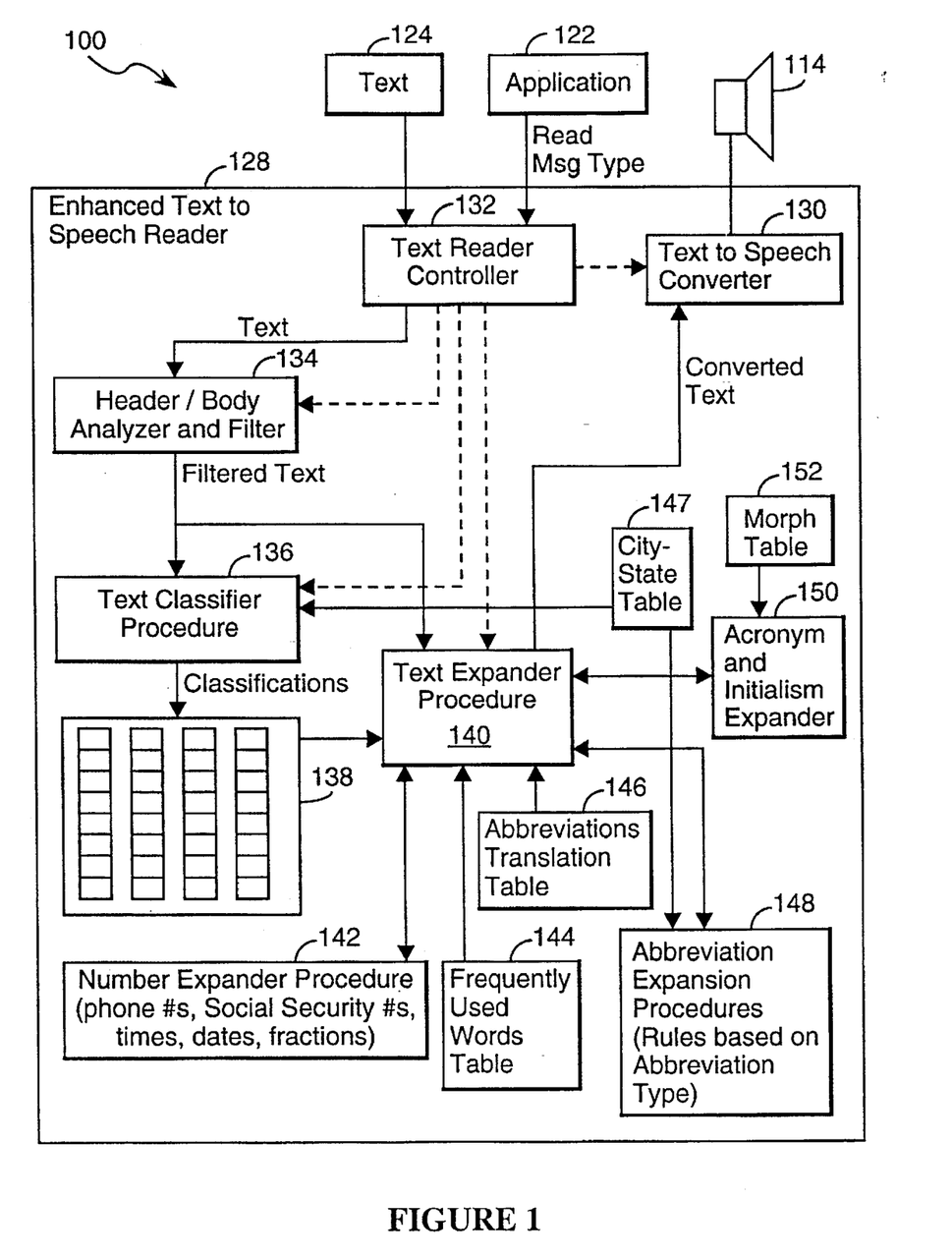
FIG. 1 is a block diagram of a computer incorporating an enhanced text reader in accordance with the present invention.

Referring to the Figures, a computer system 100 incorporating a preferred embodiment of the present invention can be any conventional computer as shown in FIG. 1, or can be a distributed computer system having one or more servers and multiple workstations. For purposes of explaining the invention, it will be assumed that the invention is incorporated in a single workstation.

The computer system 100 includes a central processing unit 102, primary memory 104 and secondary computer memory 106 subsystems, and a user interface 108. The user interface 108 typically includes a display 110, a microphone 112, an audio speaker 114, a pointing device 116 such as a mouse or trackball, and a keyboard 118 for entering text.

The computer memory 106 stores a number of different programs, sometimes herein called procedures, and data structures. These programs and data structures, which are discussed in more detail below, include the computer's operating system 120, application programs 122, one or more text files 124, an e-mail or other text database (e.g., of messages in the user's e-mail "mailbox") 126, and a text reader module 128.

The text reader module 128 includes a conventional text to speech converter 130, such as the Prose 4000 made by Centigram Communications Corp., a text reader control procedure 132, a header/body message analyzer procedure 134, a text classifier procedure 136, classifier output tables 138, a text expander procedure 140, a number expander procedure 142, a table of frequently used unambiguous words 144, an abbreviations translation table 146, a city-state table 147, a set of abbreviation expansion procedures (sometimes called rules) 148, an acronym and initialism expander procedure 150, and a morph table 152.

The computer system 100 also will typically include a communications interface 154, such as a modem or network interface, for telephone or other electronic communication with a remotely located computer or telephone 156.

Operation of the preferred embodiment will be explained by following the processing of a message by the enhanced text to speech reader 128. In particular, we will assume that a user of system 100 at a remote location calls into computer system 100 via communications interface 154. Application 122 receives the call and commands from the user, entered either using DTMF tones from a telephone keypad or verbally (if the application includes a voice to text converter recognizer). When the invention is used by a local user at the site of the computer 100, commands will more typically be entered using a mouse pointer device 116 and/or keyboard 118. Furthermore, the user requests that the application 122 "read" aloud an e-mail message having a complex header and several paragraphs of text in the body of the e-mail message.

The application program calls (step 200, FIG. 3) the text reader module 128, and in particular, makes a procedure call to the text reader control procedure 132 specifying a text to be read aloud and the type of the message. In this case the message type is "email". The other message types supported in the preferred embodiment are "address book," "spreadsheet" and "regular", although the invention can be used with other types of messages as well. The primary significance of the message type is that for e-mail messages, the message header is parsed to remove information irrelevant to most end users. Other message types are supported by other special processing, e.g., if the message type is "spreadsheet," the string "5/7" would be expanded to "five sevenths" whereas for other message types "5/7" might be expanded to "May seventh."

Additional message types are expected to be implemented in future embodiments of the invention. In particular, domain-specific or application-specific embodiments with specialized abbreviation tables are expected. For instance, an e-mail reader for a law firm or law department would include an abbreviation translation table having abbreviations frequently used in that profession, while an e-mail reader for a bio-tech research company could be customized to include an abbreviation translation table with abbreviations frequently used by biologists, chemists and genetics researchers.

Figure 3:
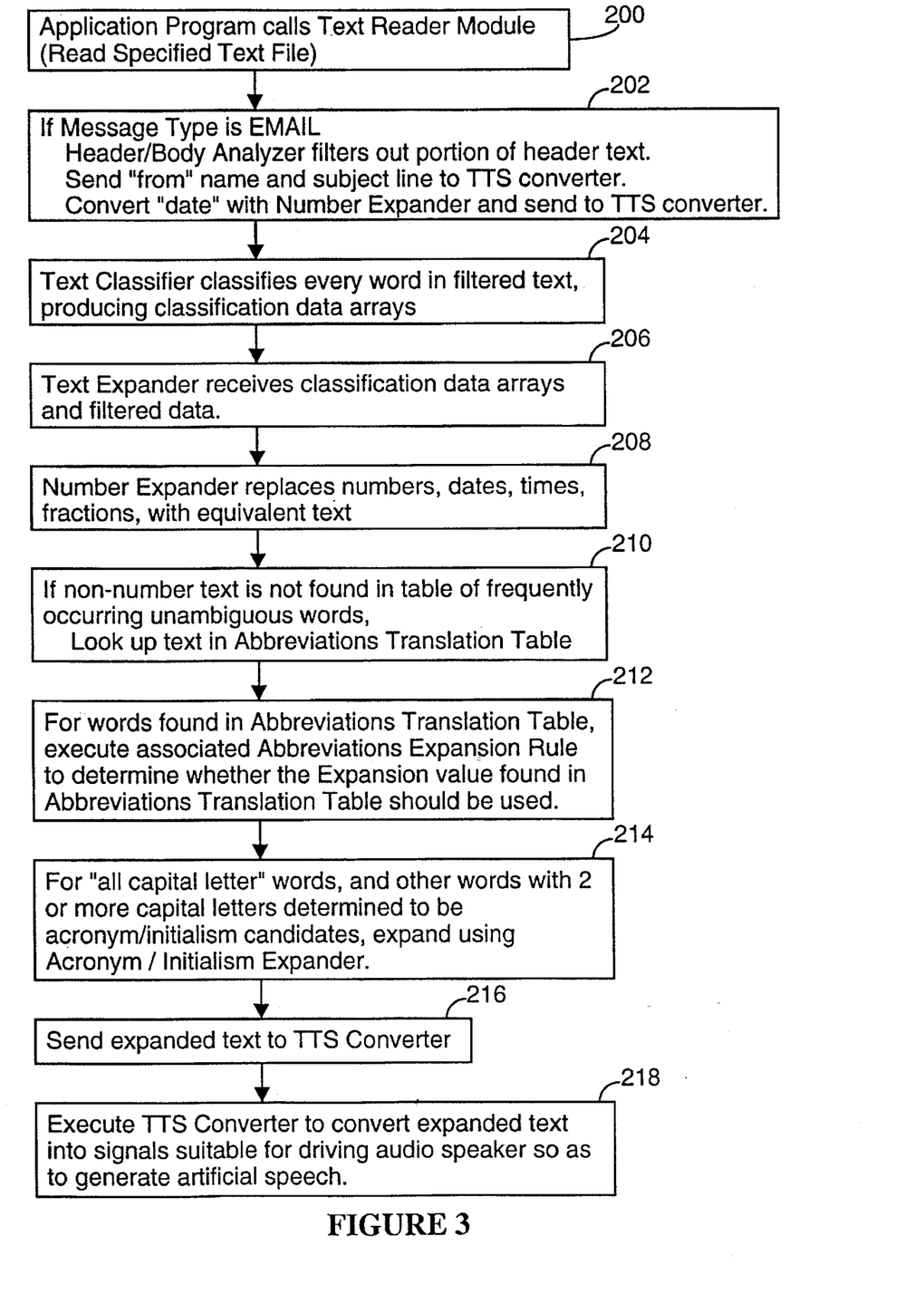
FIG. 3 is a flow chart of the enhanced text expansion and conversion process in a preferred embodiment of the present invention.

Next, if the message type is "email", which it is in our example, the text reader control procedure 132 calls a procedure called the header/body analyzer 134 (step 202). The head/body analyzer is, in essence, a filter that filters out all portions of the e-mail message header except (A) the name following the "From" label in the header, but excluding the e-mail address after that name, (B) the date following the "Date" label in the header, and (C) the text following the "Subject" label in the header. The date in the "date" line is processed by the number expander procedure 142 (e.g., expanded from "27/05/94" to "May twenty-seventh, 1994") and then passed to the text to speech converter 130 for conversion to speech. The subject header line is processed in the same manner as all other portions of the text message, as will be described next.

The text reader controller procedure processes text, other than an e-mail message header, one paragraph at time. Each paragraph is passed, in sequence, to the text classifier procedure (204) and then to the text expander procedure (206). The text in each message paragraph is thus processed in two passes. In the first pass, every word in the paragraph is analyzed and classified.

TEXT CLASSIFIER—FIRST PASS PROCESSING OF TEXT

Figure 2:
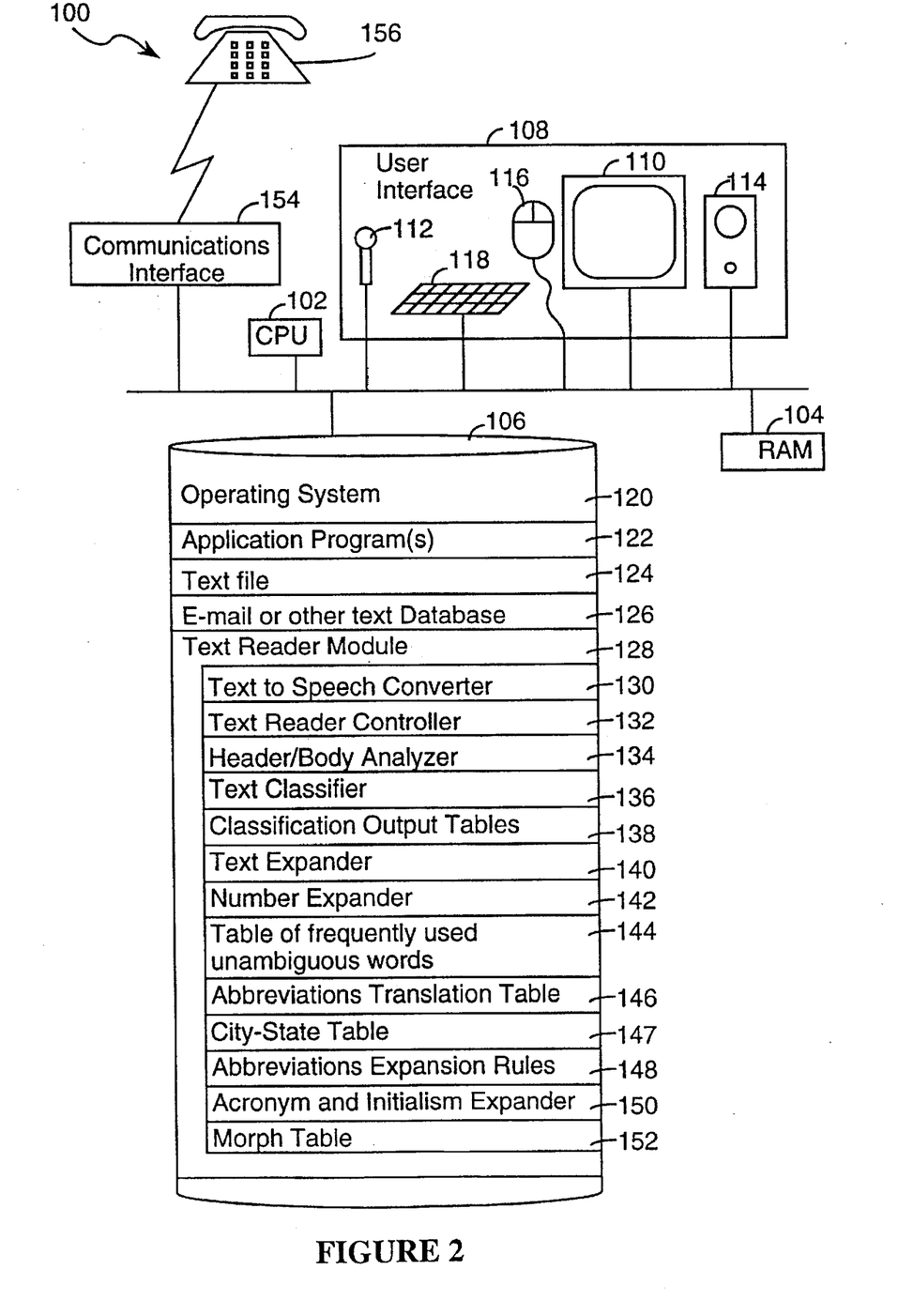
FIG. 2 is a conceptual data and control flow diagram representing the flow of data between software modules in a preferred embodiment of the present invention.

The text classifier procedure 136 generates eleven arrays 138 of classification values, each of which stores a single element for each "word" in the paragraph being processed. A word, for purposes of the enhanced text reader 128 is any chunk of text that requires separate processing. For instance, in strings having special punctuation such as slashes, hyphens, and colons, each text element separated by such punctuation is treated as a separate word. Thus the string "3/12/95" is treated as three words: 1 ) "3/", 2) "12/" and 3) "95".

As indicated above, each word in the text being processed is assigned eleven classification values by the text classifier procedure 136 and those eleven values are stored in eleven classification arrays 138. The definition of the classification values stored in each classification array 138 is listed in Table 1. The function of the Text Classifier procedure 136 is to compute values often needed by the Text Expander procedure 140 by classifying each word in the text message with regard to syntax, punctuation and membership in several predefined classes of words, the predefined classes of words including numbers, measurement units, geographic designations, and date/time values. More specifically, the Text Classifier procedure 136 determines and classifies the syntax aspects of each word with respect to capitalization and punctuation and also makes initial determinations as to whether each word may be a member of several special classes of words, such as numbers, dates, times, geographic names, measurement units, measurement modifiers and the like which may require special processing by the Text Expander procedure 140.

The provision of the Text Classifier 136 simplifies the Text Expander procedure 140 since many of the word type and syntax determinations needed for text expansion decisions are pre-computed by the Text Classifier procedure 136.

The following are descriptions of the values stored in each of the classification arrays 138 by the Text Classifier 136.

The FPER ("following period") array stores a yes/no indication for each text word, where "yes" indicates that the word ends with a period. Examples of words for which the FPER value is "yes" are abbreviations ending in a period and the last word of a sentence.

The ILC ("Initial Lower Case") array stores a yes/no indication for each text word, where "yes" indicates that the word starts with a lower-case letter and the rest of the letters of the word are lower case.

The IUC ("Initial Upper Case") array stores a yes/no indication for each text word, where "yes" indicates that the word starts with an upper-case letter and the rest of the letters are lower case. Examples of words for which the IUC value is "yes" are "San," "California," and the first word of a sentence.

The AUC ("All Upper Case") array stores a yes/no indication for each text word, where "yes" indicates that all letters in the word are upper-case. Examples of words for which the AUC value is "yes": CA, NASA.

The PSNUM ("Pseudo-number") array stores a yes/no indication for each text word, where "yes" indicates that the word is a pseudo-number, which is any word that can sometimes be used in place of a number. Examples of pseudo-numbers, which are assigned a PSNUM value of "yes" are "several," "few," and "doz." For example, when processing the "ft." abbreviation for "feet", "several ft.", "a doz. ft." and "5 ft." are all processed similarly. For purposes of generating the values for the PSNUM array, the classifier includes an internal table of pseudo-numbers and their associated standard abbreviations.

The STPROV ("State or Province") array stores a yes/no indication for each text word, where "yes" indicates that the word is an abbreviation or full word or part of an abbreviation or full word that is potentially a U.S. state name or a Canadian province name. Examples of words which are assigned a STPROV value of "yes" are Ca, CA, California, Missouri, and British Columbia. Note that the last example is actually two words, both of which will be assigned a STPROV value of "yes". For purposes of identifying abbreviations and words that represent states and provinces, the classifier looks up abbreviations in the abbreviations translation table 146 and full text words in the city-state table 147. All abbreviations for state and province names are indicated in the abbreviations translation table 146 by a "rule type" of "state." When an abbreviation is found in the table 146 to have a rule type of "state" name that word is assigned an STPROV value of "yes." When a full text word (or set of adjacent words) is found in the state field of a record in the city-state table 147, then that word is assigned an STPROV value of "yes".

The PREPUNC ("Preceding Punctuation") array stores a representation of all punctuation located at the beginning of a word, such as the left parentheses at the beginning of a telephone number's area code.

The PUNC ("Punctuation") array stores a representation of all punctuation located at the end of a word, such as a period at the end of an abbreviation. Examples of PUNC array values are:

| PUNC value | Text |
|---|---|
| . | in. |
| ., | e.g., |

The SEPR ("Separator") array stores a representation of the separator, if any, between the current word and the next, whether or not there are surrounding spaces. Examples:

| SEPR value | Text |
|---|---|
| + | 3 + 4 |
| - | 1-16-95 |
| / | 1/16/95 and 3/4 |

The NUM ("number") array stores a yes/no indication for each text word, where "yes" indicates that the word represents a number. In a number each character is an integer, period, or comma, possibly followed by a modifier like a plus sign (e.g., "20+ rules") or the letter K (e.g., "256 K memory").

Finally, the QUAL array stores a character string that describes the potential type of the word. The different Qual values and what they represent are listed in Table 1. It should be noted that the values stored in the QUAL array represent the potential type of a word. The QUAL values are determined without consideration of the context in which the word is found. It is the Text Expander procedure 140 that considers the context of each word before determining what expansion of the word is required, if any. Furthermore, it is noted that when the classifier procedure 136 finds a word in the abbreviations translation table 146, the rule type listed in the first matching record in the abbreviations translation table 146 is used as the QUAL value for that word.

TEXT EXPANDER—SECOND PASS PROCESSING OF TEXT

After the Text Classification procedure 136 completes processing of a paragraph, the Text Reader Control procedure 132 calls the Text Expander procedure 140, which receives the initial text in the paragraph as well as the classification arrays 138 generated by the Text Classifier procedure 136 (step 206).

For each word in the text paragraph, the Text Expander procedure 140 first determines whether the word is (A) one of a set of frequently used unambiguous words found in table 144 (a preferred version of which is listed in Table 2) or (B) a number (208, 210). If the word is one of a set of frequently used unambiguous words found in table 144, it is passed directly to the TTS converter 130 via the control procedure 132. If the word is a number, the Number Expander procedure 142 is called (208) by the Text Expander procedure 140.

The Number Expander procedure 142 processes not only the next word in the paragraph to be processed, but all the succeeding words that are part of the same logical quantity. Thus, a date or phone number, which is processed as a sequence of several words by the Text Classifier procedure 136, will be processed with a single call to the Number Expander 142.

The Number Expander procedure 142 evaluates punctuation and separators, as indicated in the classification arrays 136, as well as neighboring words before and after the number string being processed, to determine what type of number is represented by the received text, such as a telephone number, social security number, time, date, fraction, monetary value, or standard numeric value.

For instance, the number string "94306" is likely to be a zip code if it closely follows a city and/or state name, which is easily determined by looking at the STPROV and QUAL values for the preceding words, or by the words "zip code," in which case it should be spoken as a sequence of digits: "nine four three zero six". On the other hand, if the string "94306" is preceded by a dollar sign, then it should be spoken as a five digit dollar value: "ninety-four thousand, three hundred six dollars". The Number Expander procedure expands each number value to a full word string based on the determination of the type of number represented by the text, and passes the result to the TTS converter.

Any word not processed by the Number Expander and not found in the table of frequently occurring unambiguous words is next processed by looking it up in the abbreviations translation table 146 (step 210). Each record in the abbreviations translation table 146 has the following three fields:

keyword, expansion value, rule type where "keyword" is an abbreviation value, "expansion value" is a potential full word expansion of the abbreviation value, and "rule type" is a reference to which of the abbreviation expansion procedures 148 is to be executed (212) to determine whether or not the expansion value should be used.

For instance, the abbreviation "sq" might have three entries in the abbreviations translation table 146:

sq, square, qualifier sq, Square, street sq, squadron, military where "qualifier," "street," and "military," are the names of three distinct abbreviation expansion procedures 148 that are called "rules" for convenience. The "qualifier" rule is that the abbreviation value should be used if the abbreviation is preceded by a number or precedes a word whose QUAL value is "measure". The "street" rule is that the abbreviation value should be used if the abbreviation is preceded by a word having an initial upper case (i.e., if IUC is equal to "yes" for the preceding word). The "military" rule is that the abbreviation value should be used if the abbreviation is preceded or followed (within 2 words) by a word or words such as Air Force, fighter, flight, bomber and so on.

Another example of multiple entries in table 148 for a single abbreviation value is:

mo, Missouri, state mo, Monday, weekday mo, month, measure where the "state" rule indicates that "mo" should be expanded to "Missouri" if (a) immediately followed by a 5-digit or 9-digit integer, (b) immediately preceded by a city name in Missouri, (c) abbreviated by period and followed immediately by a lower case word (i.e., for which ILC is equal to "yes"), or (d) known to be part of an address.

The "date" rule indicates that "mo" should be expanded to "Monday" if (a) adjacent to another weekday, (b) separated from another weekday or month word (i.e., a word whose QUAL value is "weekday" or "month") by a day-type integer (i.e., a word whose QUAL value is "day"), or (c) is adjacent to a time expression (i.e., a word whose QUAL value is "time").

The "measure" rule indicates that the abbreviation value ("mo" in this example) should be expanded to the expansion value ("month" in this example) if (a) immediately preceded by a number or a number followed by a measure qualifier, or (b) preceded or followed by a word whose QUAL value is "day" or "year".

If a word is found in the abbreviations translation table and evaluation of the associated rule results in a determination that the abbreviation value should be used, then the resulting expansion value is passed to the TTS converter (212).

USING THE CITY-STATE TABLE

Part (b) of the above mentioned "state" rule requires that the text expander procedure 140 have access to information regarding which cities are located in which states and provinces. City and state names are distinguished from other abbreviations, in part, through use of the city-state table 147 and in part through use of the abbreviations translation table 146. The city-state table 147 is a list of city-state pairs. That is, every record in the table 147 has two fields:

state name field, city name field where the state name field stores the full text name of a state or province and the city name field stores the full or abbreviated text of a city name in the state or province identified in the state name field.

As previously explained, when a word that is potentially a state name or province (or an abbreviation of a state name or province) is detected by the classifier procedure 136, the corresponding record in the STPROV array is set to a value of "Yes" and, if the word being analyzed is an abbreviation, then the full text name of the corresponding state name is stored in the corresponding record in the QUAL array. If a word (or pair of words) in the specified text represent the full text of a state or province name, then the STPROV record for that word (or words) is set to a value of Yes, and the corresponding QUAL record(s) stores (store) the unexpanded full text of the state or province name.

When a word that is a city name (or potentially an abbreviation of a city name) is detected by the classifier procedure 136, the keyword "city" is stored by the classifier procedure in the corresponding record in the QUAL array.

To further explain the use of the city-state table, we will consider how the enhanced text to speech reader 128 handles the three-word sequence "S F, CA". A portion of the city-state table 147 includes the following records:

california, san bernardino
california, san diego
california, san francisco
california, san jose
california, san mateo and two portions of the abbreviation table contain the following records:

ca, California, state1
ca, California, state3
ca, circa, misc_abbr
cal, California, state2
calg, Calgary, city
calif, California, State3,
camb, Cambridge, city s bern, San Bernardino, city
s c, South Carolina, State1
s d, San Diego, city
s d, South Dakota, state1
s d, South Dakota, state3
s dak, South Dakota, state3
s diego, San Diego, city
s f, San Francisco, city
s f, Santa Fe, city
s f, Sioux Falls, city
s j, San Jose, city
s l, Salt Lake City, city
s mateo, San Mateo, city
s sgt, Staff Sergeant, title3
s, South, direction
sa, Saturday, weekday
. . .
sd, South Dakota, state1

During the first pass through the text, which is performed by the text classifier procedure 136, the classifier marks the words S F as AUC (all upper case) and QUAL=city, and marks the word "CA" as AUC, STPROV=Yes, and QUAL= "California". The two words S F are identified as a city by the classifier by searching the abbreviation translation table 146. The first matching abbreviation translation record found by the classifier has a rule type of "city", and that rule type is stored in the QUAL record for both words (S F).

The second pass through the text, performed by the text expander procedure 140, finds the first record in the abbreviation table matching the words S F:

s f, San Francisco, city and therefore it applies the city abbreviation expansion rule. The city rule notes that the words S F are all upper case (as indicated by their AUC values) and that these words are followed by an all upper case state name (AUC and STPROV for the next word, CA, are both equal to Yes). When this pattern of words is detected, the city rule searches the city-state table for a record that matches city=San Francisco, state=California. More generally, the city abbreviation expansion procedure searches for a match of city= expansion value, state=QUAL value.

Since a match for city=San Francisco, state=California is found in the city-state table, the expansion value "San Francisco" is accepted for the text message words S F.

Next, the text expander procedure 140 processes the word CA. In the abbreviation translation table the first matching record found by the text expander is ca, California, state1 and thus it executes the state1 abbreviation expansion rule 148 to determine if the expansion text "California" should be accepted. The state1 rule (i.e., procedure) computes several conditions, one of which is a check that the preceding word has either IUC or AUC equal to Yes and QUAL= city, thereby indicating that the preceding word(s) is(are) a city name. Since the preceding word(s) represent the city name San Francisco, the state1 rule looks for a match in the city-state table for state=California, city=San Francisco. When it finds a matching record in the city-state table, the expansion text "California" is accepted as the expansion of the word "CA".

If the text message had been "San Francisco, CA", the QUAL value for the words "San Francisco" would have been "city" and IUC (initial upper case) would have been equal to Yes. When the words preceding a potential state name have IUC equal to Yes, the city-state table is searched by the state1 rule for a record matching city=preceding words, state=potential state name. Since a matching record would be found in the city-state table for city=San Francisco, state=California, the expansion value "California" would be accepted by the state1 rule.

If the word following S F had been SD (for South Dakota), then the text expander procedure 140 would not have found a match for state=South Dakota, city=San Francisco, and would therefore have rejected the abbreviation expansion "San Francisco" found in the first "s f" record in the expansion translation table 146. Since no match would have been found, the text expander procedure 140 would then try the next potential expansion for the "S F" abbreviation as represented by the next "s f" record in the abbreviation translation table 146. This process continues until either an abbreviation translation record is found for which the associated rule is satisfied, in which case the expansion text in the abbreviation translation record is accepted, or the original text is not expanded in accordance with any of the records in the abbreviation translation table 146.

ACRONYM/INITIALISM EXPANDER

Next, any word not sent to the TTS converter by the Number Expander procedure 142, or due to its presence in the frequently used unambiguous words table 144 or due to a successful match with a record in the abbreviations translation table 146, is inspected to determine if it is an acronym or initialism (214). If not, the word is passed to the TTS converter (216). Words that are potentially acronyms or initialisms must have at least two letters and include at least two capital letters. Furthermore, the Acronym/Initialism expander 150 is not used to process upper-case words that are immediately preceded by or followed by an upper-case word (except the words I or A) as this may signify emphasis (e.g., "He said DO NOT do it. ").

As explained above, an acronym is formed from pronounceable syllables, even if it represents a "made up word," while an initialism is not pronounceable except as a sequence of letters and numbers. Thus, "IBM" and "YMCA" are initialisms, while "NASA" and "UNICEF" are acronyms. Some words, such as "MSDOS" and "PCNET" are a mix of acronym and initialism components.

In the following discussion, the term "strip," as in "x is stripped off the word," means that the stripped off letters are to be treated as a separate unit or morph for further processing. "Stripped" off items are not discarded.

The term "spelled out" means that the letters of the spelled out item are stated in sequence. Thus, spelling out "PCN" means outputting the sequence "P-C-N" to the TTS converter.

The Acronym/Initialism expander 150 performs the following functions. If the word being processed has both upper-case and lower-case letters, case is used to separate morphemes (herein called morphs). For example, LabVIEW is separated at the junction between lower-case and upper-case letters into Lab and VIEW. The resulting morphs are then treated separately.

Next, the Acronym/Initialism expander 150 strips off any morphs found in morph table 152 from the word being processed (e.g., DEC, DOS, Info, Net), going through the word from left to right, except if the letters in the matching morph are part of a word in an exceptions list (e.g., December, Decor, Dose, Inform). Each of the stripped off morphs is treated separately.

The following then is applied to each of the morphs. When three of the same letter are in sequence, they are replaced with the words "triple x" where x is the letter. Sequences of three or more adjacent consonants (other than three of the same letter in sequence) are spelled out. One-letter and two-letter sequences are also spelled out, with certain exceptions (e.g., BE, BY, DO).

Using C to represent any consonant and V to represent any vowel, each morph is analyzed going from left to right. In a sequence (C1) V1 C2 V2 where parentheses are used to mean that the item in parentheses is optional, the morph is split after V1. In a sequence (C1) V1 C2 C3 V2, the morph is split after C2.

Initial vowels in sequences like V1 C2 V2 are stripped off (e.g., A-MEN, E-TON).

At this point we are left with either a C V ... or C V C ... syllable. If there is an unusual vowel sequence at the beginning or end of a syllable, e.g., ae, aa, ii, ui as in SAE, CAA, NII, DUI, the syllable is spelled out.

Next, the procedure usually strips off and spells out an unusual consonant such as C before I or E in some cases, and X except before E. Whether stripping occurs depends on subsequent letters, e.g., CID sequences are spelled except for those followed by ER as in CIDER.

If the only thing left is a C V sequence of letters, e.g., PO in APO and RA in ERA, the Acronym/Initialism procedure 150 spells out the remaining letters.

Next, going from left to right, the Acronym/Initialism procedure 150 checks for acceptable initial C V and C C V sequences (e.g., Low, Foe, Toe, Moe, Pro, Fro, Stow, Slow are all acceptable) and strips any unacceptable consonants until an acceptable sequence remains. This results in outputs to the TTS converter such as V-RAM, M-PEG, P-C-NET, where the consonants before the hyphens are consonants that have been stripped off.

Whatever remains is then processed from right to left, checking for acceptable final C V and C C V sequences (e.g., Rope, Rose, Bone, Bore, Calm, Mild, Mint, Elf, Tenth, are acceptable). Unacceptable consonants are stripped from the end of the morph until an acceptable sequence remains. A final S (which may indicate a plural word) is not considered when performing this right to left processing step. This right to left check results in outputs to the TTS converter such as NET-X, FAS-B and HUM-V.

If the only remaining letters are two letters that fit the pattern CV, those letters are spelled out. Otherwise the remaining text is left unchanged.

Finally, the resulting units or morphs are strung together with connecting hyphens, and the resulting string is passed to the TTS converter. In summary, the acronym/initialism expanding procedure 150 identifies words in the text message that are acronyms and initialisms, parses pronounceable syllables within the identified words and generates a substitute string comprising a sequence of units. Each unit in the generated sequence consists of a letter, number, pronounceable syllable or a multiple letter identifier.

The TTS converter processes all strings passed to it in accordance with well known text to speech conversion procedures, thereby generating a verbal representation of the text message. In particular, the control procedure 132 passes to the text to speech converter 130 for each word in the text message (A) the expansion value, if any, generated by the abbreviation expander procedure 140, (B) the substitute string, if any, generated by the acronym/initialism expanding procedure 150, and otherwise (C) the word.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For instance, it would be possible to make the classifier procedure a subprocedure of the text expander procedure such that the classifier is not used to process some words, such as state names following city names, when the text expansion process for the prior words has already expanded or inherently classified those words, and is used more efficiently in contexts where the text expander already knows some likely characteristics of a word from the prior word or words.

TABLE 1

Classifier Data Structures

| Data Structure | Description of Record Contents |
| --- | --- |
| all | Each data structure contains one record for each word in the filtered text. |
| FPER | yes/no indication of word ending with period. Examples of words for which value is yes: abbreviation ending in period; last word of a sentence. |

TABLE 1-continued

Classifier Data Structures

| Data Structure | Description of Record Contents |
|---|---|
| ILC | yes/no indication of Initial Lower Case, i.e., whether the word starts with a lower-case letter and the rest of the letters of the word are lower case. Example: house |
| IUC | yes/no indication of Initial Upper Case, i.e., whether the word starts with an upper-case letter and the rest of the letters are lower case. Examples: San, California, He. |
| AUC | yes/no indication of All Upper Case, i.e., whether all letters in the word are upper-case. Example: CA, NASA |
| PSNUM | yes/no indication of pseudo-number. A pseudo-number is any word that can sometimes be used in place of a number. Examples: several, few, doz. |
| STPROV | yes/no indication of an abbreviation or full word that potentially represents a U.S. state name or a Canadian province name. Examples: Ca, CA, California, Missouri, British Columbia. |
| PREPUNC | punctuation at the beginning of a word, such as the left parentheses at the beginning of a telephone number's area code. Example: "("for the word "(415)". |
| PUNC | punctuation at the end of a word, such as a period at the end of an abbreviation. Examples: "." for the word "in."; ","for the word "e.g.,". |
| SEPR | separator between the current word and the next, whether or not there are surrounding spaces. Examples: "+" for the words (3 + 4), "-" for 1-16-95, and "/" for 1/16/95 and 3/4. |
| NUM | yes/no indication of a number. In a number each character is an integer, period, or comma, possibly followed by a modifier like a plus sign (e.g., "20+ rules") or the letter K (e.g., "256K memory"). |
| QUAL | a character string that describes the potential type of a word. |

| QUAL Value | Description and Examples |
|---|---|
| time | any time value, e.g., 3:45 |
| ordinal | ordinal number, e.g., 21st, 3rd, fifth |
| day | any number in the range 1–31 |
| oldyr | any 2-digit number greater than 31 or any three digit number, e.g., 35, 250 |
| year | any 4-digit number less than 2500 |
| direction | any compass direction indication, such as E, W, N, S, NE, NNW |
| measure | any unit of measurement such as ft., yd. |
| spelled number | any spelled out number, such as eleven |
| measure modifier | measurement modifier or qualifier, such as cubic, running, across, odd |
| comparison | comparison words, such as older, colder |
| which | item indication words, such as this, multiple |
| month | any full word or abbreviated month |
| weekday | any full word or abbreviated day of the week |
| range | reference to something within a range of numeric values, such as grade, chapter |
| sports term | beat, loss |
| city | indication of a potential city name |
| full state name | a value such as California, or Missouri is stored in the QUAL array for potential state and province names |
| misc_abbr. | indicates an abbreviation that doesn't fall into other categories |
| ampm | morning/evening indicator: a.m., PM |
| bcad | era indicator: BC, b.c., AD, a.d. |
| Roman | any string that might be a roman number, such as XII, IV, xii |
| title | a person's title, such as Mrs., Gov., Maj. |
| street | street type indicator, such as road, rd., ave. |

TABLE 2

Frequently Used Unambiguous Words the
of
and
you
that
was
with
his
they
this
have
by
one
had
not
but
what
were
when
there
your
which
their

What is claimed is:

1. A computer system for converting a text message into audio signals, including:

a text to speech converter that translates text into audio signals;

a text reader control procedure for receiving said text message, said text message having a sequence of words;

a classifier procedure, coupled to said text reader control procedure, that classifies specified words in said text message with regard to syntax, punctuation and membership in predefined classes of words, said predefined classes of words including numbers, measurement units, geographic designations, and date/time values; said classifier procedure generating classification values for said words in said text message; and an abbreviation expanding procedure that receives said classification values and said text message, identifies abbreviation words in said text message that match predefined abbreviations and identifying a set of potential expansion values for each said identified abbreviation word, evaluates based on said classification values for words neighboring said identified words and in accordance with a predefined set of rules which, if any, of said potential expansion values is applicable, and substituting said potential expansion value for said identified abbreviation word when said evaluation yields a success value;

wherein said text reader control procedure includes instructions for receiving expansion values from said abbreviation expanding procedure, and passing to said text to speech converter for each word in said text message said expansion value, if any, generated by said abbreviation expanding procedure for said word.

2. A computer system for converting a text message into audio signals, including:

a text to speech converter that translates text into audio signals;

a text reader control procedure for receiving said text message, said text message having a sequence of words;

an acronym/initialism expanding procedure, coupled to said text reader control procedure, that identifies words in said text message that are acronyms and initialisms, parsing pronounceable syllables within said identified words and generating a substitute string comprising a sequence of units, each unit selected from the set consisting of a letter, number, pronounceable syllable and multiple letter identifier; said acronym/initialism expanding procedure including instructions for separating pronounceable syllables and individual letters not pronounceable as syllables from an identified word in said text message in accordance with predefined word parsing criteria;

wherein said text reader control procedure includes instructions for receiving said substitute strings from said acronym/initialism expanding procedure, and passing to said text to speech converter for each word in said text message said substitute string, if any, generated by said acronym/initialism expanding procedure.

3. A computer system for converting a text message into audio signals, including:

a text to speech converter that translates text into audio signals;

a text reader control procedure for receiving said text message, said text message having a sequence of words;

a classifier procedure, coupled to said text reader control procedure, that classifies specified words in said text message with regard to syntax, punctuation and membership in predefined classes of words, said predefined classes of words including numbers, measurement units, geographic designations, and date/time values; said classifier procedure generating classification values for said words in said text message;

an abbreviation expanding procedure that receives said classification values and said text message, identifies abbreviation words in said text message that match predefined abbreviations and identifying a set of potential expansion values for each said identified abbreviation word, evaluates based on said classification values for words neighboring said identified words which, if any, of said potential expansion values is applicable, and substituting said potential expansion value for said identified abbreviation word when said evaluation yields a success value; and an acronym/initialism expanding procedure, coupled to said classifier procedure, that identifies words in said text message that are acronyms and initialisms, parsing pronounceable syllables within said identified words and generating a substitute string comprising a sequence of units, each unit selected from the set consisting of a letter, number, pronounceable syllable and multiple letter identifier; said acronym/initialism expanding procedure including instructions for separating pronounceable syllables and individual letters not pronounceable as syllables from an identified word in said text message in accordance with predefined word parsing criteria;

wherein said text reader control procedure includes instructions for receiving expansion values from said abbreviation expanding procedure and said substitute strings from said acronym/initialism expanding procedure, and passing to said text to speech converter for each word in said text message (A) said expansion value, if any, generated by said abbreviation expanding procedure for said word, (B) said substitute string, if any, generated by said acronym/initialism expanding procedure, and (C) said word otherwise.

4. The computer system of claim 3, an abbreviation dictionary having, for each of a plurality of predefined abbreviations, one or more abbreviation expansion entries, each abbreviation expansion entry indicating one said potential expansion value associated with a particular one of said predefined abbreviations and indicating one of said predefined set of rules for determining the applicability of said potential expansion value;

said abbreviation expanding procedure including instructions for evaluating each said identified potential expansion value for each said identified abbreviation word by executing said rule indicated in the corresponding abbreviation expansion entry in said abbreviation dictionary, and selecting said identified potential expansion value as a substitution value for said identified abbreviation word when said executed rule returns a predefined value indicating applicability of said identified potential expansion value.

5. The computer system of claim 1, an abbreviation dictionary having, for each of a plurality of predefined abbreviations, one or more abbreviation expansion entries, each abbreviation expansion entry indicating one said potential expansion value associated with a particular one of said predefined abbreviations and indicating one of said predefined set of rules for determining the applicability of said potential expansion value;

said abbreviation expanding procedure including instructions for evaluating each said identified potential expansion value for each said identified abbreviation word by executing said rule indicated in the corresponding abbreviation expansion entry in said abbreviation dictionary, and selecting said identified potential expansion value as a substitution value for said identified abbreviation word when said executed rule returns a predefined value indicating applicability of said identified potential expansion value.

6. A memory for storing data for access by programs being executed on a data processing system, said memory comprising:

a text to speech converter that translates text into audio signals;

a text reader control procedure for receiving said text message, said text message having a sequence of words;

a classifier procedure, coupled to said text reader control procedure, that classifies specified words in said text message with regard to syntax, punctuation and membership in predefined classes of words, said predefined classes of words including numbers, measurement units, geographic designations, and date/time values; said classifier procedure generating classification values for said words in said text message; and an abbreviation expanding procedure that receives said classification values and said text message, identifies abbreviation words in said text message that match predefined abbreviations and identifying a set of potential expansion values for each said identified abbreviation word, evaluates based on said classification values for words neighboring said identified words and in accordance with a predefined set of rules which, if any, of said potential expansion values is applicable, and substituting said potential expansion value for said identified abbreviation word when said evaluation yields a success value;

wherein said text reader control procedure includes instructions for receiving expansion values from said abbreviation expanding procedure, and passing to said text to speech converter for each word in said text message said expansion value, if any, generated by said abbreviation expanding procedure for said word.

7. The memory of claim 6, an abbreviation dictionary having, for each of a plurality of predefined abbreviations, one or more abbreviation expansion entries, each abbreviation expansion entry indicating one said potential expansion value associated with a particular one of said predefined abbreviations and indicating one of said predefined set of rules for determining the applicability of said potential expansion value;

said abbreviation expanding procedure including instructions for evaluating each said identified potential expansion value for each said identified abbreviation word by executing said rule indicated in the corresponding abbreviation expansion entry in said abbreviation dictionary, and selecting said identified potential expansion value as a substitution value for said identified abbreviation word when said executed rule returns a predefined value indicating applicability of said identified potential expansion value.

8. The memory of claim 6, further including an acronym/initialism expanding procedure, coupled to said classifier procedure, that identifies words in said text message that are acronyms and initialisms, parsing pronounceable syllables within said identified words and generating a substitute string comprising a sequence of units, each unit selected from the set consisting of a letter, number, pronounceable syllable and multiple letter identifier;

wherein said text reader control procedure includes instructions for receiving expansion values from said abbreviation expanding procedure and said substitute strings from said acronym/initialism expanding procedure, and passing to said text to speech converter for each word in said text message (A) said expansion value, if any, generated by said abbreviation expanding procedure for said word, (B) said substitute string, if any, generated by said acronym/initialism expanding procedure, and (C) said word otherwise.

9. A memory for storing data for access by programs being executed on a data processing system, said memory comprising:

a text to speech converter that translates text into audio signals;

a text reader control procedure for receiving said text message, said text message having a sequence of words;

an acronym/initialism expanding procedure, coupled to said text reader control procedure, that identifies words in said text message that are acronyms and initialisms, parsing pronounceable syllables within said identified words and generating a substitute string comprising a sequence of units, each unit selected from the set consisting of a letter, number, pronounceable syllable and multiple letter identifier; said acronym/initialism expanding procedure including instructions for separating pronounceable syllables and individual letters not pronounceable as syllables from an identified word in said text message in accordance with predefined word parsing criteria;

wherein said text reader control procedure includes instructions for receiving said substitute strings from said acronym/initialism expanding procedure, and passing to said text to speech converter for each word in said text message said substitute string, if any, generated by said acronym/initialism expanding procedure.

10. A method of converting a text message into audio signals, comprising the steps of:

receiving said text message, said text message having a sequence of words;

classifying specified words in said text message with regard to syntax, punctuation and membership in predefined classes of words, said predefined classes of words including numbers, measurement units, geographic designations, and date/time values; said classifying step generating classification values for said words in said text message; and identifying abbreviation words in said text message that match predefined abbreviations and identifying a set of potential expansion values for each said identified abbreviation word;

evaluating based on said classification values for words neighboring said identified words and in accordance with a predefined set of rules which, if any, of said potential expansion values is applicable, and substituting in said received text message said potential expansion value for said identified abbreviation word when said evaluation yields a success value; and translating said received text message with said substituted expansion values, if any, into audio signals.

11. The method of claim 10, said abbreviation word identifying step including accessing an abbreviation dictionary having, for each of a plurality of predefined abbreviations, one or more abbreviation expansion entries, each abbreviation expansion entry indicating one said potential expansion value associated with a particular one of said predefined abbreviations and indicating one of said predefined set of rules for determining the applicability of said potential expansion value;

said abbreviation word identifying step further including evaluating each said identified potential expansion value for each said identified abbreviation word by executing said rule indicated in the corresponding abbreviation expansion entry in said abbreviation dictionary, and selecting said identified potential expansion value as a substitution value for said identified abbreviation word when said executed rule returns a predefined value indicating applicability of said identified potential expansion value.

12. The method of claim 10, identifying words in said text message that are acronyms and initialisms, parsing pronounceable syllables within said identified words and generating a substitute string comprising a sequence of units, each unit selected from the set consisting of a letter, number, pronounceable syllable and multiple letter identifier; said substitute string generating step including separating pronounceable syllables and individual letters not pronounceable as syllables from an identified word in said text message in accordance with predefined word parsing criteria;

said substituting step including substituting in said received text message for each word in said text, said substitute string, if any, generated by said acronyms and initialisms identifying, parsing and generating steps.

13. A method of converting a text message into audio signals, comprising the steps of:

receiving said text message, said text message having a sequence of words;

identifying words in said text message that are acronyms and initialisms, parsing pronounceable syllables within said identified words and generating a substitute string comprising a sequence of units, each unit selected from the set consisting of a letter, number, pronounceable syllable and multiple letter identifier; said substitute string generating step including separating pronounceable syllables and individual letters not pronounceable as syllables from an identified word in said text message in accordance with predefined word parsing criteria;

substituting in said received text message for each word in said text, said substitute string, if any, generated by said acronyms and initialisms identifying, parsing and generating steps; and translating said received text message with said substitute strings, if any, into audio signals.

* * * * *